Dec. 9, 1941.　　　V. F. SLEZAK　　　2,265,748

MACHINE FOR DISPENSING HOROSCOPES

Filed July 25, 1938　　　7 Sheets-Sheet 1

Inventor

Vincent F. Slezak

By Mason & Porter

Attorneys

Dec. 9, 1941.                V. F. SLEZAK                2,265,748
                MACHINE FOR DISPENSING HOROSCOPES
                    Filed July 25, 1938            7 Sheets-Sheet 2

Fig.3.

Inventor

Vincent F. Slezak

By Mason & Porter

Attorneys

Dec. 9, 1941. V. F. SLEZAK 2,265,748
MACHINE FOR DISPENSING HOROSCOPES
Filed July 25, 1938 7 Sheets-Sheet 3

Fig.4.

Inventor
Vincent F. Slezak
By T. Mason & Porter
Attorneys

Dec. 9, 1941.  V. F. SLEZAK  2,265,748
MACHINE FOR DISPENSING HOROSCOPES
Filed July 25, 1938  7 Sheets-Sheet 6

Fig. 8.

Inventor
Vincent F. Slezak
By Mason & Porter
Attorneys

Patented Dec. 9, 1941

2,265,748

UNITED STATES PATENT OFFICE 2,265,748

MACHINE FOR DISPENSING HOROSCOPES

Vincent F. Slezak, Chicago, Ill.

Application July 25, 1938, Serial No. 221,252

15 Claims. (Cl. 312—53)

The invention relates generally to coin-controlled, article dispensing machines, and has for an object to provide certain new and useful improvements in machines of this general type adapted for dispensing card or strip-like units, or more particularly in astrological machines for dispensing horoscopes based on the relation of the zodiac signs or periods to given birthdays, such as are alluded to in my co-pending applications for Letters Patent filed respectively on November 10, 1936, Serial Number 110,148, and December 22, 1937, Serial Number 181,217.

In the machines of the patent applications referred to, horoscopes rolled into compact cylindrical form are dispensed, one by one, from a magazine selected by a prospective purchaser and by movement of the magazine, the number of the movable and selective magazines preferably being equal to the number of the months or the signs of the zodiac.

An object of the invention is to provide in a machine of the character stated, horoscope dispensing means, actuating devices, manually operable means for storing energy in said actuating devices, and a controlled means for releasing the stored energy to effect an actuation of said devices and a dispensing of a horoscope unit.

Another object of the invention is to provide a novel combination of the horoscope dispensing apparatus with a weighing scale so that a part of the scale equipment movable incident to a weighing function operates to store energy in the dispensing means actuating devices.

Another object of the invention is to provide a novel coin control equipment for releasing stored energy and which is entirely independent of the weighing function of the scale.

Another object of the invention is to provide novel means for storing energy including an element movable incident to weighing operations, latching means for retaining stored energy and thereafter enabling free use of the weighing scale without disturbing the energy storing means, and equipment for releasing stored energy to effect a dispensing of a horoscope unit and restore said energy storing means to the influence of the movable element.

With these and other objects in view which will more fully appear, the nature of the invention will be more clearly understood by following the description, the appended claims and the several views illustrated in the accompanying drawings.

In the drawings:

Figure 3 is an enlarged face view, a fragment only of the scale structure being shown.

Figures 1, 2, 7:
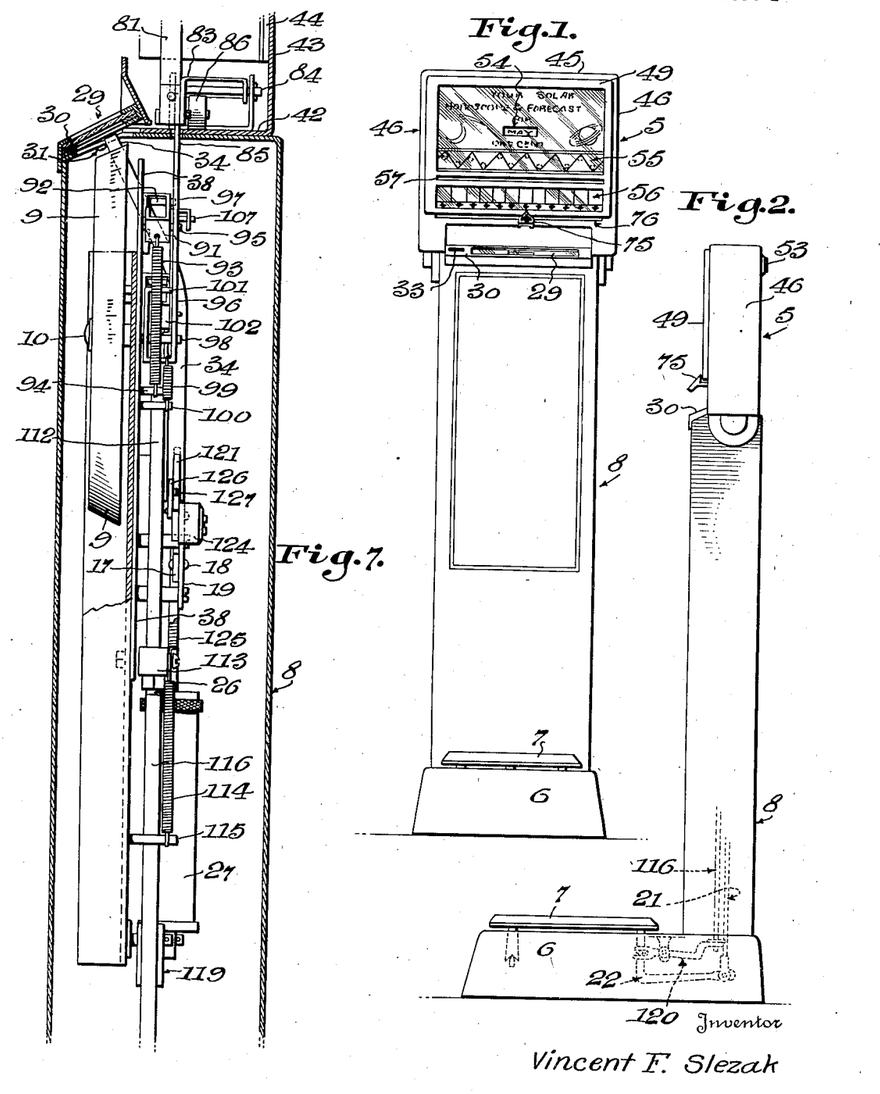
Figure 1 is a face view illustrating the invention mounted upon a scale structure.
Figure 2 is a side elevation.
Figure 7 is a detail vertical cross section taken on the line 7—7 on Figure 4.
Figure 4:
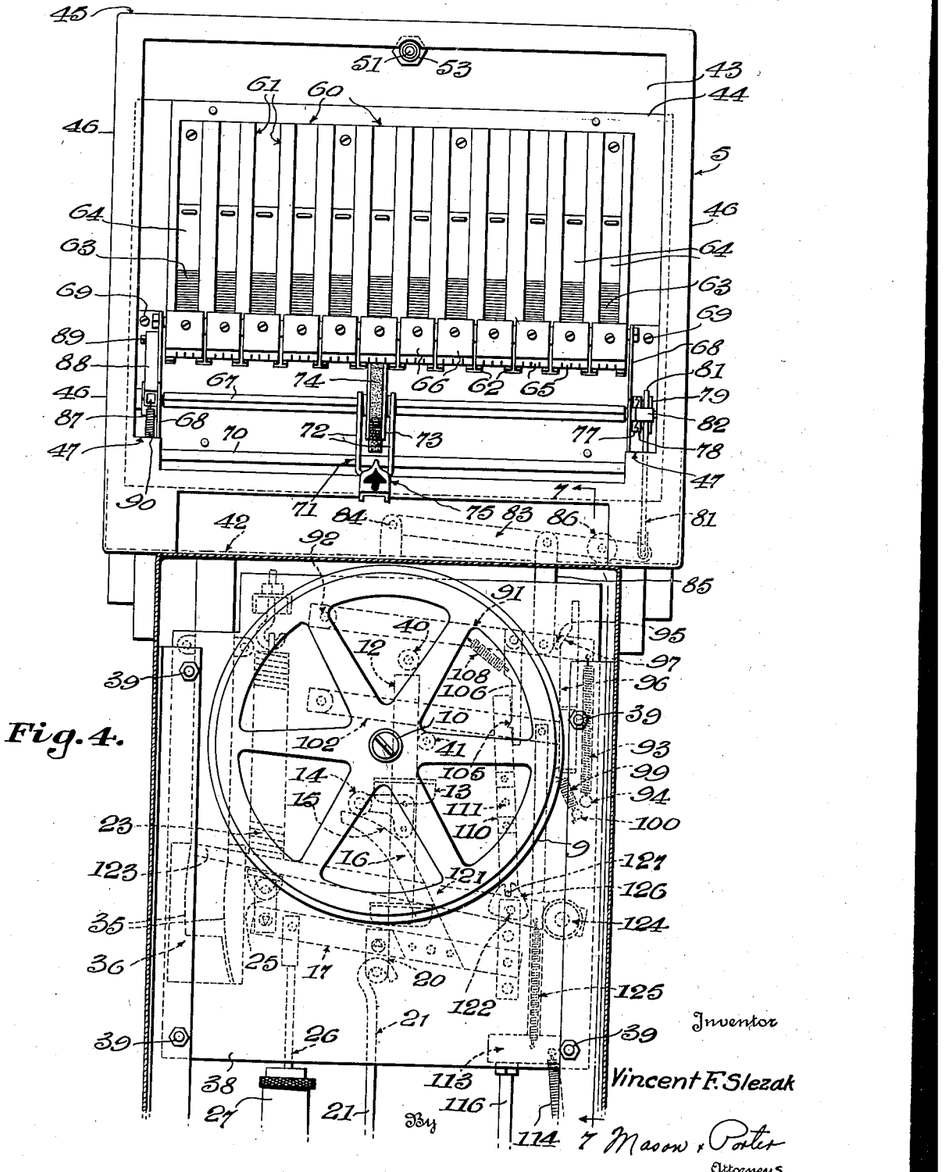
Figure 4 is an enlarged front face view, face plate portions being removed and casing portions shown in section.
Figure 5:
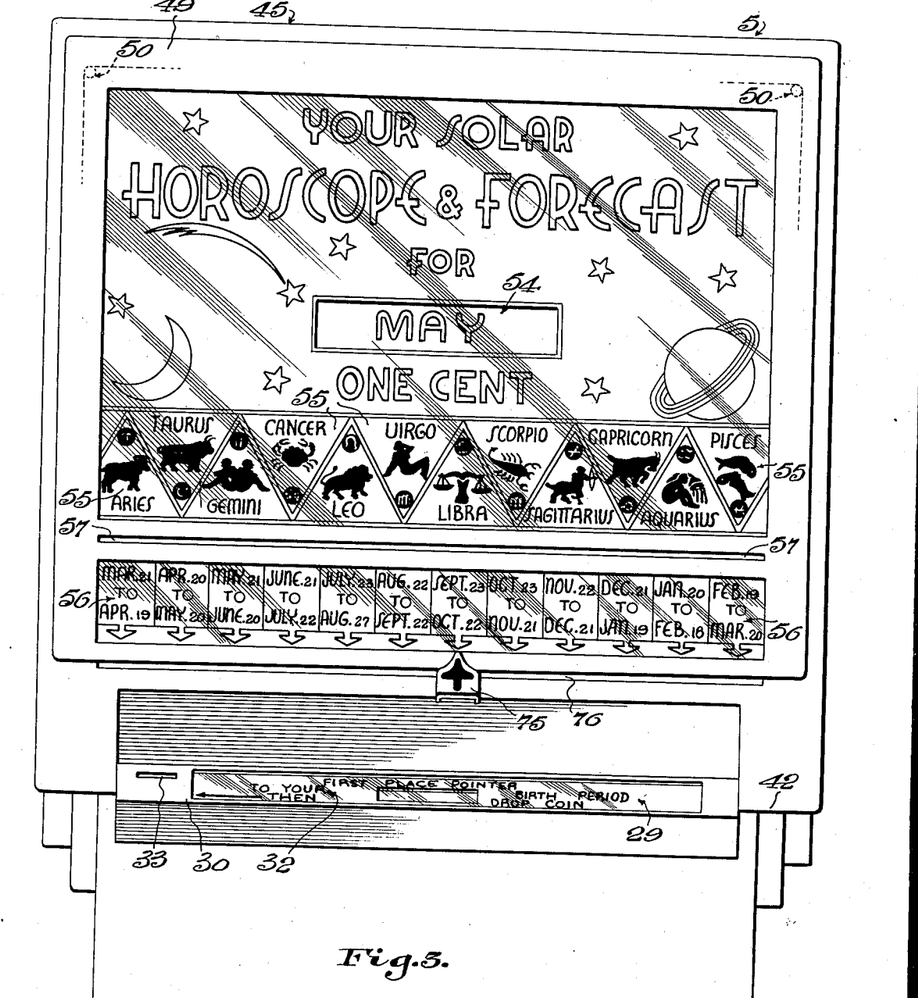
Figure 5 is an enlarged rear face view, face plate portions being removed and casing portions shown in section, the normal position of the parts being shown in full lines and the energy storing position of the parts being shown in dotted lines.
Figure 6:
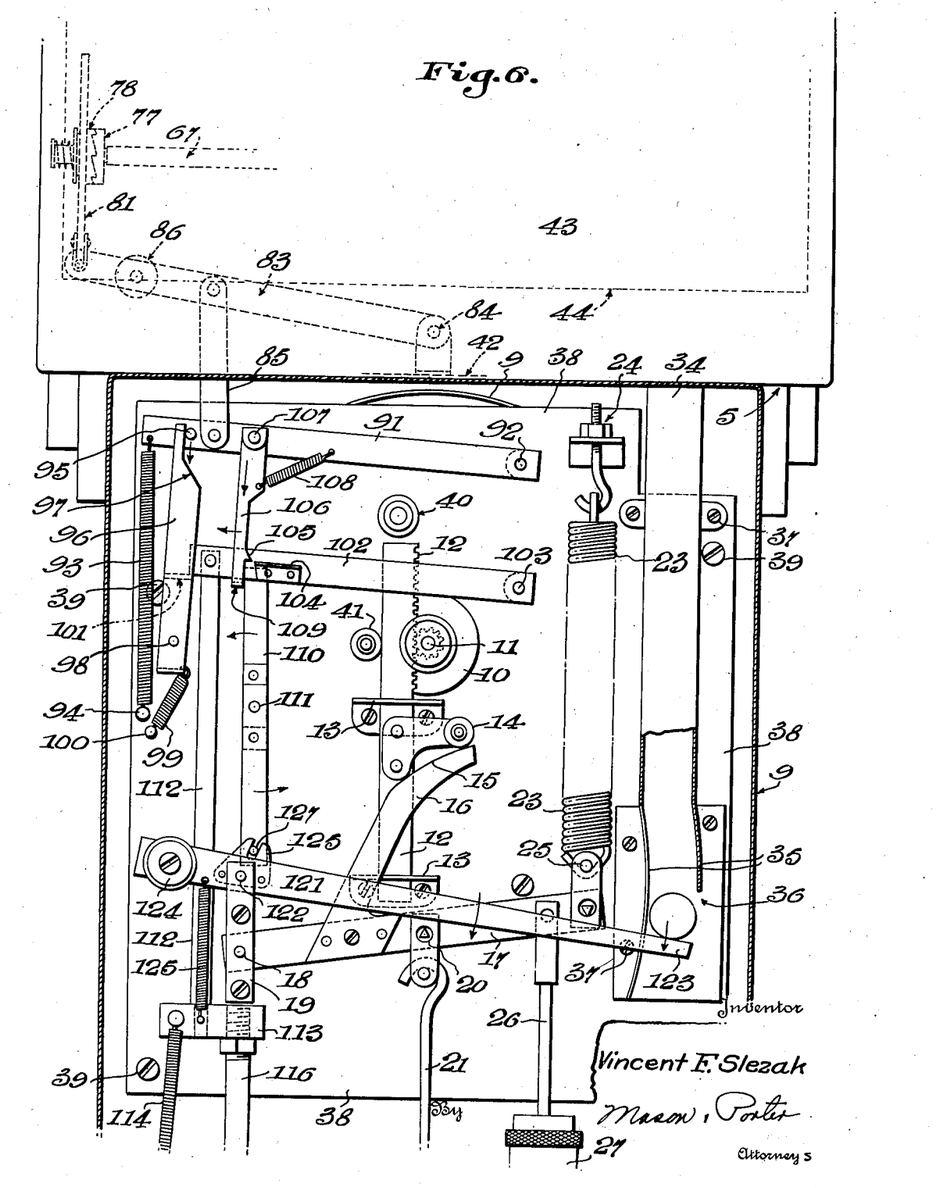
Figure 6 is a view similar to Figure 5 and illustrates a coin-controlled releasing of the stored energy for effecting a horoscope unit ejection.

In this particular disclosure, the improved horoscope dispensing apparatus, generally designated 5, is mounted in any suitable manner upon the top of a conventional form of weighing scale including the usual base 6, platform 7, and pedestal or column standard 8 in the nature of a hollow rectangular casing within which is contained the conventional weighing apparatus. See Figures 1 and 2.

The scale herein disclosed includes the usual scale dial or rotor 9 which is rotatably supported as at 10 and includes a toothed shaft portion 11 engaged by a gravity rack 12 vertically slidable in bearings 13. The gravity slide carries a stop roller 14 engageable with the limiting surface 15 of a stop arm 16. The stop arm is rigidly secured to the scale beam 17 which is pivoted at 18 in a bracket 19 fixedly supported in the scale standard 8. The scale beam 17 is connected by knife edge and stirrup, as at 20, with a pull rod 21 which is depressed whenever a person steps upon the platform 7, through the medium of an arm 22 connected therewith and moved by depression of said platform. The free end of the beam scale 17 is normally held in the elevated position by the spring 23 which is anchored as at 24 in the standard 8 and connected by knife edge and stirrup equipment with said beam as indicated at 25. The beam may also be connected as at 26 with a suitable dashpot equipment 27 stationarily supported as at 28 in the scale standard. See Figures 4 to 7.

Each time a person steps upon the platform 7 the pull rod 21 will be depressed and the free end of the scale beam 17 lowered against the tension of the spring 23 and under control of the dashpot equipment 26, 27. As the beam is lowered the support afforded by the stop arm surface 15 will be removed from beneath the stop roller 14 and the rack 12 permitted to gravitate until the downward movement thereof is terminated by contact between the roller and said stop arm surface 15. Downward movement of the rack 12 will impart rotation to the scale dial or rotor 9 for the purpose of indicating the weight of the person standing upon the platform. This weighing mechanism may of course be coin-controlled, but in this particular disclosure the scale is of the "free" type in which a weighing function can be had without cost, that is, without coin control.

The marked periphery of the scale dial 9 may be viewed through a window 29 in a face plate member 30 removably secured as at 31 on the scale standard. See Figures 3 and 9. The face plate bears suitable indicia 32 by which a prospective user is instructed in the manner of operating the apparatus and also includes a coin slot 33. At its inner terminus, the coin slot 33 registers with a coin chute 34 which delivers between lateral guide flanges 35, one of which is cut away as at 36 to provide a coin discharge outlet. The chute 34, 35 is secured as at 37 to a mounting plate 38 which is in turn removably secured as at 39 to the scale standard 8. It will be observed that the single mounting plate 38 also serves as a common support for the dial 9, the slide bearings 13, the bracket 19, and the spring 23. This plate also carries a stop roller 40 for limiting upward movement of the rack 12, and a bearing roller 41 which engages and holds the rack 12 against the toothed rotor shaft portion 11.

Except for the particular coin slot and chute equipment and the horoscope dispensing means generally designated 5, all parts thus far described are conventional weighing scale parts and form no part of the present invention except insofar as they are combined with means later to be described. As previously stated the weighing scale apparatus herein referred to may be operated without the necessity of inserting coins, and as often as is desirable without effecting any dispensing of horoscope units. Coins dropped into the slot and chute equipment 33, 34, 35 have no control over the weighing scale and only serve to cooperate with horoscope dispensing equipments later to be described.

The horoscope dispensing apparatus mounted at the upper end of the scale standard and generally designated 5, includes a base 42 which is secured in any approved manner atop the scale standard, a rear wall 43, to which a reinforcing and mounting plate 44 is secured, and a top 45 and sides 46 the edges of which are turned inwardly to define an open front including seating flanges 47. See Figures 4, 9 and 11.

The seating flanges 47 serve as supports for mounting fingers 48 secured to the rear face of a removable front plate 49 having centering lugs 50 for engaging in the flanged opening to support the plate against lateral displacement. The plate also carries an internally threaded lug 51 for receiving the free end of a securing captive screw 52 rotatable in a lock bearing 53 mounted on the rear wall 43. By insertion of a suitable key, rotation may be imparted to the screw 52, and when this screw is properly entered in the front plate lug 51, the front plate, resting upon the seat flanges 47, can be removably secured in position over the opening front of the casing.

The front plate includes a center window 54 through which a changeable month sign affixed to the rear face of the plate can be viewed, and across the plate beneath said window the signs of the zodiac are attractively displayed in equidistantly spaced relation as indicated at 55. In this particular illustration these signs are displayed in triangular spaces arranged with their bases horizontally aligned and with their apices reversely directed. Beneath the signs of the zodiac, a horizontal strip portion indicated at 56 is divided into twelve equidistantly spaced portions individually and vertically aligned with the zodiac sign displays, each said portion bearing dates corresponding to the related zodiac sign. Each date inscribed portion and the related zodiac sign designation is aligned with an individual horoscope magazine housed within the casing and soon to be described. See Figure 3.

A horoscope delivery slot 57 traverses the front face between the zodiac sign and date bearing strip portions 55 and 56, and at its inner face the front plate 49 carries a guide flange 58 for guiding dispensed horoscope units into and through said slot.

Figure 8:
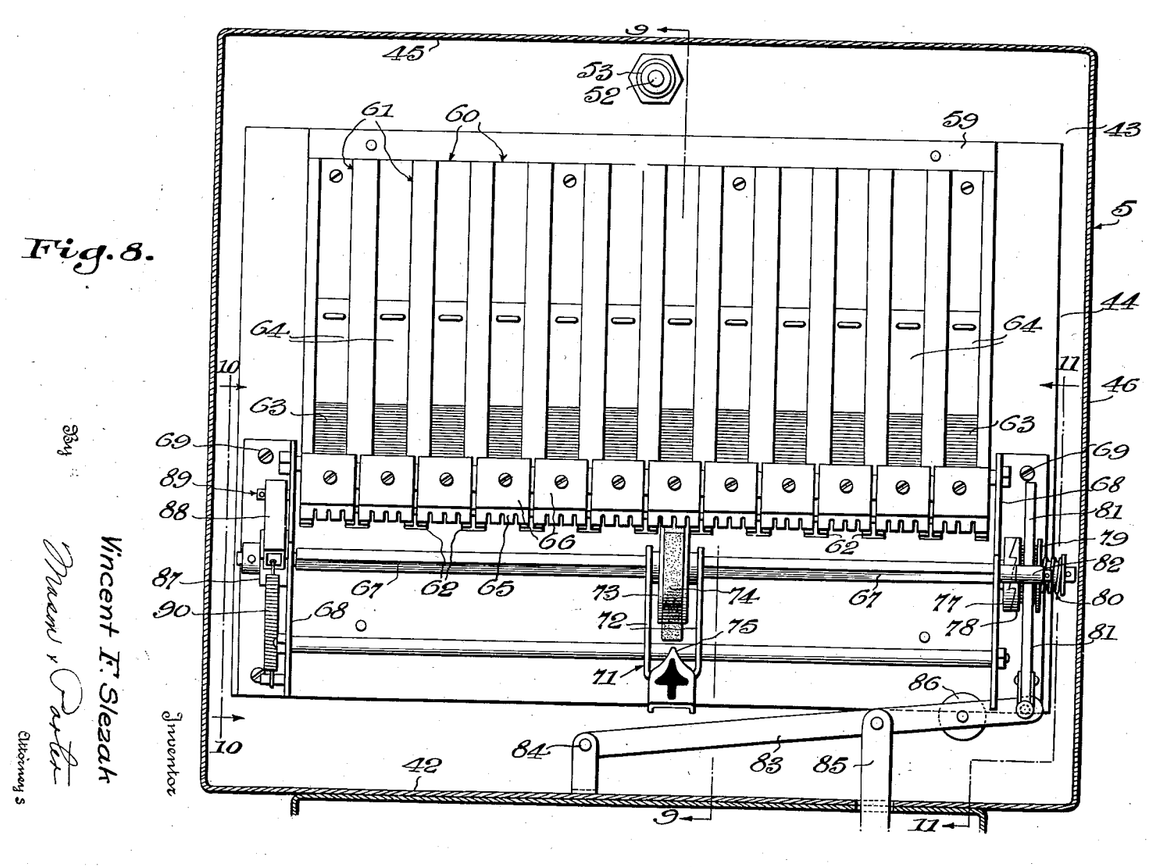
Figure 8 is an enlarged detail face view of the dispensing mechanism, parts being broken away and in section.

A mounting bracket 59 is secured to and spaced from the plate 44 and serves to support a plurality of individual horoscope dispensing magazines 60, twelve such magazines being shown, one registering with each of the signs of the zodiac and the co-related date marked space portion hereinbefore referred to. The magazines are arranged side by side across the dispensing apparatus housing and each includes closed side and back portions, an open front defined by inwardly directed flanges 61, and an open bottom defined by inwardly turned forwardly and downwardly directed flanges 62 on which rest the column of horoscope cards or slips 63. It is to be understood that upon the cards or strips in each column are printed the horoscope corresponding to the particular sign of the zodiac and date designation aligned with that column. A weighted follower block 64 rests upon the column of horoscope units in each magazine. See Figures 8 and 9.

At the lower ends of the front flanges 61 of each magazine, or at the horoscope delivery point defined by the meeting portions of the front flanges 61 and the bottom flanges 62, is mounted a yieldable stripper or retainer element 65 formed of flexible material, preferably rubber shaped to present a feathered edge and backed by a removable keeper plate 66. As the horoscope cards or strips are individually dispensed from the respective magazines the elements 65 yieldably resist the ejection of the slips and insure against the dispensing of more than one horoscope unit at a time. Beneath and common to all of the magazines is mounted a non-circular shaft 67, the ends of the shafts being rotatably supported in end bearing plates 68 secured as at 69 to the mounting plate 44. At points below the shaft 67, the plates 68 also support a pair of guide rods 70 which slidably support a magazine selector slide 71 having spaced arms 72 through which the shaft 67 passes and between which, and on the shaft 67, an ejector wheel 73 is mounted. The wheel is slid along the shaft 67 by movement of the slide 71 for the purpose of positioning the wheel in cooperative relation with a selected one of the various magazines generally designated 60. The wheel carries three equidistantly spaced rubber ejector segments 74 engageable with the lowermost horoscope unit in a selected magazine for the purpose of ejecting said unit. A handle and magazine selecting pointer 75 extends from the slide 71 through the slotway 76 provided in the front plate 49 just beneath the date bearing strip portions 56. By grasping the handle 75 and moving it longitudinally in the slot 76, so as to bring the pointer into registry with a desired date bearing space 56, it is possible for a person desiring to obtain his horoscope to position the ejector wheel 73, 74 in cooperative relation with and beneath the proper magazine from which the horoscope is to be dispensed.

At one end the shaft 67 carries a ratchet disk 77 the ratchet face of which is opposed by a similar disk 78 loosely mounted on the shaft 67 and including a pinion extension 79. The ratchet disks 77, 78 are yieldably held in interconnected relation by a spring 80. A rack member 81 engages the pinion 79 and is held against the pinion by a bearing roller 82. At its lower end the rack is connected to the free end of a lever 83 pivoted at 84 within the dispensing apparatus housing and carrying an actuator link 85 which is pivotally connected to the lever intermediate its ends and depends from said lever through a suitable opening in the bottom of the dispensing apparatus casing and the top of the weighing scale standard into the upper portion of said standard. The lever 83 carries a stop roller 86 adjacent its free end which serves to limit downward movement of the rack 81 by contact with the bottom of the dispensing apparatus casing. See Figures 4 and 5.

Each time the lever 83 is lifted the rack 81 will be lifted and the ratchet disk 78 will move freely about the shaft 67 without imparting movement to the companion disk 77, however, when the link 85 and rack 81 are moved in the opposite direction, or downwardly, the rotation imparted in this manner to the disk 78 will be transmitted through the companion disk 77 and the shaft 67 to the ejector wheel 73, 74.

Figures 9, 10, 11:
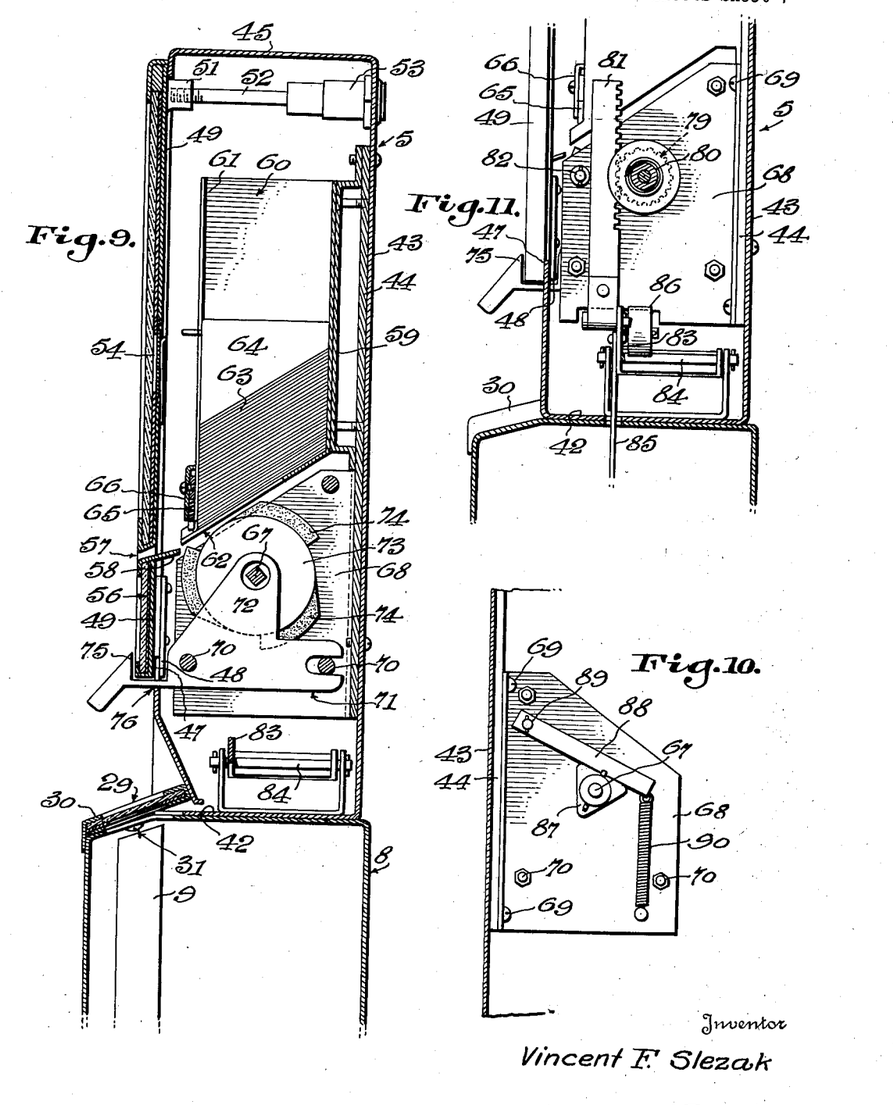
Figure 9 is a vertical cross section taken on the line 9—9 of Figure 8.
Figure 10 is a detail vertical cross section taken on the line 10—10 on Figure 8.
Figure 11 is a detail vertical section taken on the line 11—11 on Figure 8.

It will be noted by reference to Figure 9 of the drawings that each sector 74 of the ejector wheel is effective to eject a single horoscope unit. Thus by rotating the wheel intermittently through successive steps of 120° each, three horoscope ejections will be effected for each complete rotation of the wheel. In order to limit the successive rotary step movements of the wheel so as to properly position a wheel sector 74 beneath the magazines at the conclusion of each step movement of the wheel, an equilateral triangular positioning disk 87 is secured at the end of the shaft opposite that which bears the ratchet disk equipment. The disk 87 is engaged by a holder arm 88 pivoted as at 89 on the adjacent bearing plate 68, the free end of the arm being held against one or another of the flat stop faces of the disk by a spring 90 suitably anchored to the plate 68. The arm 88 engages the successively presented flat faces of the disk 87 and assures successive inactive positioning of the ejector wheel 73, 74 in positions exemplified in Figure 9 of the drawings. See Figure 10.

At its lower end the actuator link 85 is connected intermediate the ends of an energy storing arm 91 pivotally supported at one end as at 92 on the mounting plate 38 and having its free end connected with an energy storing spring 93 anchored as at 94 to said plate. The arm 91 carries an actuator pin 95 engaged by a latch finger 96 having a cam portion 97 pivotally supported intermediate its ends as at 98 on the mounting plate 38. A spring 99 anchored as at 100 on the mounting plate 38 engages the lower end of the finger 96 and holds the cam portion 97 thereof against the pin 95. See Figure 6.

The latch finger 96 also carries a latch member 101 engageable with the free end of an arm 102 pivotally supported as at 103 on the plate 38. The arm 102 carries a latch lug 104 engageable with a latch lug 105 projecting from another latch finger 106 pivotally supported as at 107 on and depending from the arm 91. A spring 108 connected respectively to the finger 106 and the arm 91 constantly urges the lower free end of the finger 106 toward the latch lug 104, and at its lower end the finger 106 carries a detent 109 engageable with the upper end of a lever 110 for limiting movement of the free end of the finger in the direction in which it is urged by the spring 108. The lever 110 is pivotally supported intermediate its ends as at 111 on the mounting plate 38 and serves a purpose later to be described.

A thrust rod 112 is secured to the free end of the arm 102 and is in turn secured at its lower end to a coupling block 113 normally held down by a spring 114 anchored as at 115 in the scale standard 8. The block 113 is carried at the upper end of a thrust rod 116 vertically reciprocable in the scale standard 8 and having secured thereto a dashpot equipment 117, the movable rod or plunger 118 of which is anchored as at 119 in the standard. The thrust rod equipment 112, 113, 116 is elevated each time a person stands upon and depresses the scale platform 7, any suitable actuating mechanism 120 being provided for this purpose. Vertical movement of the rod equipments serves an energy storing purpose soon to be described.

An actuator arm 121 is pivotally supported intermediate its ends as at 122 in the bracket 19, one free end 123 of said arm being positioned beneath the coin chute 34 for receiving coins deposited therein and for being depressed by such coins. The other free end of the arm is counterpoised as at 124 and has connected thereto a spring 125 connected at its lower end to the block 113. By reason of the provision of the spring 125, whenever the rod equipment 112, 113, 116 is in its lowered position, the spring will be loaded sufficiently to overcome the depressing effect of a coin, whereas when the block 113 is elevated by depression of the scale platform, the spring 125 will be unloaded and the arm 121 rendered subject to depression by a coin thereafter or previously deposited in the chute 34. The purpose of this safety equipment will later be described.

The arm 121 carries a fork 126 into which a pin 127 carried by the lower end of the lever 110 is projected so that swinging movement of the arm 121 imparts swinging movement to the lever 110.

In operation, each time a person steps onto the platform 7 the platform will be depressed, the conventional weighing apparatus actuated by the downward pull on the rod 21 as hereinbefore described, and the thrust rod equipment 112, 113, 116 will be forced upwardly. Each such upward movement of the rod equipment swings the arm 102 upwardly, and since the latch lugs 104, 105 are in engagement, the arm 91 likewise will be swung upwardly and will store energy in the spring 93 and impart an upward movement to the lever 83 and rack 81 through the medium of the connecting link 85. As the actuator pin 95 moves upwardly with the arm 91, its relation to the cam portion 97 of the latch finger 96 enables that finger to move toward the free end of the arm 102 and permit the latch member 101 to engage under the free end of the arm 102 and hold it and the arm 91 in the energy storing, rack elevated position.

By manipulation of the handle and pointer 75 the ejector wheel can be moved into cooperative relation with the desired magazine and by then depositing a coin through the slot 33 and into the chute 34, depression of the arm 121 can be effected, the spring 125 having previously been unloaded by elevation of the block 113. As the arm 121 swings downwardly the fork and pin engagement 127, 126, swings the lever 110 in a direction for causing its upper end to engage the detent 109 of the latch finger 106, causing the latch lugs 105 and 104 to be disengaged to permit the energy stored in the spring 93 to pull the arm 91, the link 85, the arm 83 and the rack 81 downwardly, thus imparting 120° of rotary movement to the ejector wheel and causing a single selected horoscope unit to be projected through the delivery slot 57.

It will be obvious that persons can use the scale as often as desirable to weigh themselves without depositing a coin and selecting and ejecting a horoscope unit. However, when the scale is so used without employing the horoscope vending facility, energy will be stored in the spring 93 and will remain so stored until released by the depositing of a coin. The storing and holding of the energy, however, does not prevent future operations of the weighing equipments and pull rod 21, and during such uses of the scale alone, the thrust rod 116 and the previously stored energy will not be disturbed.

It will also be obvious that but for the provision of the spring 125, it would be possible for a person not entirely familiar with the operation of the apparatus, to deposit a coin and attempt to select and eject a horoscope unit without mounting the scale platform, in which case the coin would depress the arm 121 and fall away without any effect. But by providing the spring 125, depression of the arm 121 by coin insertion is impossible without first stepping onto the platform and effecting an unloading of the spring 125 as hereinbefore described.

It is of course to be understood that the details of structure and arrangement of parts may be variously changed and modified without departing from the spirit and scope of the invention.

I claim:

1. The combination of means for storing horoscopes to be vended, means for dispensing the horoscopes one at a time, actuating devices for said dispensing means including a spring, a weighing scale, means actuated upon operation of the scale for storing energy in the spring, latching devices actuated incident to a scale operation and unaffected by similar succeeding operations for retaining the stored energy, and means for releasing the latching devices for effecting a horoscope dispensing operation.

2. The combination of means for storing horoscopes to be vended, means for dispensing the horoscopes one at a time, actuating devices for said dispensing means including a spring, a platform scale, means actuated by movement of the scale platform for storing energy in the spring, means for retaining the stored energy until later released to dispense a horoscope and unaffected by succeeding platform depressions prior to such release, and means for releasing the retaining means.

3. In apparatus of the character described, means for storing horoscopes to be vended, means for dispensing the horoscopes one at a time including an actuating arm, a weighing scale, spring means for moving the arm in one direction, means movable with a part of the weighing scale and incident to a weighing operation for moving the arm in the opposite direction for storing energy in the spring, latching means for securing the arm in the energy storing position permitting free successive use of the scale without disturbing the stored energy, and means for releasing said arm to effect the dispensing of a horoscope.

4. In apparatus of the character described, means for storing horoscopes to be vended, means for dispensing the horoscopes one at a time, actuating devices for said dispensing means including an actuating arm, a spring for moving said arm in one direction, a second arm, manual means for moving said second arm, latch devices for causing said arms to move in unison in a direction for storing energy in said spring, latch means for securing the second arm in an energy storing position, and means for releasing the latch devices and the latch means for releasing the stored energy to effect a horoscope dispensing and for permitting both arms to return to normal position.

5. In apparatus of the character described, means for storing horoscopes to be vended, means for dispensing the horoscopes one at a time, actuating devices for said dispensing means including an actuating arm, a spring for moving said arm in one direction, a second arm, manual means for moving said second arm, latch devices for causing said arms to move in unison in a direction for storing energy in said spring, latch means for securing the second arm in an energy storing position, means for releasing the latch devices for releasing the first mentioned arm and the stored energy to effect a horoscope dispensing, and means actuated by movement of the first mentioned arm for releasing the latch means and permitting the second arm to return to its normal position.

6. In apparatus of the character described, means for storing horoscopes to be vended, means for dispensing the horoscopes one at a time including an actuating arm, a spring means for moving the arm in one direction, a second movable arm, a platform, a thrust rod displaced by the platform and connected to the second arm for imparting movement thereto, latch devices for causing said arms to move in unison in a direction for storing energy in said spring, latch means for securing the second arm in an energy storing position, and means for releasing the latch devices and the latch means for releasing the stored energy to effect a horoscope dispensing and for permitting both arms to return to normal position and the rod to its normal relation with the platform.

7. In apparatus of the character described, means for storing horoscopes to be vended, means for dispensing the horoscopes one at a time including an actuating arm, a spring means for moving the arm in one direction, a second movable arm, a platform, a thrust rod displaced by the platform and connected to the second arm for imparting movement thereto, latch devices for causing said arms to move in unison in a direction for storing energy in said spring, latch means for securing the second arm in an energy storing position, means for releasing the latch devices for releasing the first mentioned arm and the stored energy to effect a horoscope dispensing, and means actuated by movement of the first mentioned arm for releasing the latch means and permitting the second arm to return to its normal position and the rod to its normal relation with the platform.

8. The combination of means for storing horoscopes to be vended, means for dispensing the horoscopes one at a time, actuating devices for said dispensing means including a spring, a platform scale, means actuated by movement of the scale platform for storing energy in the spring, means for retaining the stored energy until later released to dispense a horoscope and unaffected by succeeding platform depressions prior to such release, means for releasing the retaining means, and means for preventing the actuation of said releasing means except when energy is stored in said spring.

9. In apparatus of the character described, means for storing horoscopes to be vended, means for dispensing the horoscopes one at a time, actuating devices for said dispensing means including an arm, spring means for moving the arm in one direction, a platform, a second arm moved in one direction by said platform, latch devices for causing said arms to move in unison in a direction for storing energy in said spring, latch means for securing the second arm in an energy storing position, means effective only for releasing the latch devices for releasing the first mentioned arm and the stored energy to effect a horoscope dispensing, and means actuated by movement of the first mentioned arm for releasing the latch means and permitting the second arm to return to its normal position.

10. In apparatus of the character described, means for storing horoscopes to be vended, a platform, a spring-actuated horoscope dispensing means, a dispensing means actuating arm, spring means for moving the arm in one direction, a second movable arm, a thrust rod displaced by the platform connected with the second arm for imparting movement thereto, latch devices for causing said arms to move in unison in a direction for storing energy in said spring, latch means for securing the second arm in an energy storing position, means including a lever for releasing the latch devices for releasing the first mentioned arm and the stored energy to effect a horoscope dispensing, means actuated by movement of the first mentioned arm for releasing the latch means and permitting the second arm to return to its normal position and the rod to its normal relation with the platform, and spring means loaded by movement of the rod to its normal position and unloaded when the rod is displaced for preventing depression of the releasing lever except when energy is stored in the first mentioned spring.

11. A vending machine comprising means for storing articles to be vended, means for dispensing the articles one at a time, actuating devices for said dispensing means including an actuating arm, a spring connected to said actuating arm, means for moving said actuating arm for storing power in said spring, a latch for preventing operation of the actuating arm when power is stored in said spring, means for releasing the latch for dispensing the article, and means for preventing actuation of the releasing means when there is no energy stored in the spring for operating the actuating arm.

12. A vending machine comprising means for storing articles to be vended, means for dispensing the articles one at a time, actuating devices for said dispensing means including an actuating arm, a spring connected to said actuating arm, means for moving said actuating arm for storing power in said spring, a latch for preventing operation of the actuating arm when power is stored in said spring, means for releasing the latch for dispensing the article, and means for preventing actuation of the releasing means when there is no energy stored in the spring for operating the actuating arm, said last-named means including a spring normally loaded and effective to prevent actuation of the releasing means and which is unloaded each time energy is stored in the first-mentioned spring to condition the releasing means for effective use.

13. A vending machine comprising means for storing articles to be vended, means for dispensing the articles one at a time, actuating devices for said dispensing means including an actuating arm, a spring connected to said actuating arm for operating the same when power is stored in the spring, a setting arm, latching means connecting the setting arm to said actuating arm, a platform, means interposed between the platform and the setting arm for raising said arms for storing power in said spring, and a latch for holding said setting arm in raised position so as to permit free movement of the platform, and manual means for releasing the latch connecting the arms for dispensing a horoscope.

14. A vending machine comprising means for storing articles to be vended, means for dispensing the articles one at a time, actuating devices for said dispensing means including an actuating arm, a spring connected to said actuating arm for operating the same when power is stored in the spring, a setting arm, latching means connecting the setting arm to said actuating arm, a platform, means interposed between the platform and the setting arm for raising said arms for storing power in said spring, a latch for holding said setting arm in raised position so as to permit free movement of the platform, manual means for releasing the latch connecting the arms for dispensing a horoscope, and means operated by the actuating arm for releasing the latch holding the setting arm so that both of said arms are returned to initial position upon the vending of the horoscope.

15. A vending machine comprising means for storing articles to be vended, means for dispensing the articles one at a time, actuating devices for said dispensing means including an actuating arm, a spring connected to said actuating arm for moving said arm for dispensing an article, a setting arm, a latch connecting the setting arm to the actuating arm for raising the same, a platform, a thrust bar operated by the platform for raising the setting arm and the actuating arm connected thereto by the latch, a second latch for holding the setting arm in raised position so as to permit said platform to be operated without affecting the actuating devices for the horoscope, a releasing lever for releasing the latch supporting the actuating arm to permit the same to be spring-actuated for delivering the horoscope, and means operated by the actuating arm for releasing the latch for the setting arm, so that both arms will return to lowered position upon the dispensing of the horoscope.

VINCENT F. SLEZAK.